US007941362B2

(12) United States Patent
Borsand

(10) Patent No.: US 7,941,362 B2
(45) Date of Patent: *May 10, 2011

(54) SYSTEM AND METHOD FOR DYNAMIC QUANTITY ORDERS IN AN ELECTRONIC TRADING ENVIRONMENT

(75) Inventor: Steven F. Borsand, Deerfield, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/909,437

(22) Filed: Oct. 21, 2010

(65) Prior Publication Data

US 2011/0040672 A1 Feb. 17, 2011

Related U.S. Application Data

(63) Continuation of application No. 12/754,736, filed on Apr. 6, 2010, now Pat. No. 7,844,525, which is a continuation of application No. 11/417,516, filed on May 3, 2006, now Pat. No. 7,742,977, which is a continuation of application No. 10/676,641, filed on Oct. 1, 2003, now Pat. No. 7,668,767.

(51) Int. Cl.
*G06Q 40/00* (2006.01)

(52) U.S. Cl. ............................................ 705/37

(58) Field of Classification Search .................. None
See application file for complete search history.

(56) References Cited

U.S. PATENT DOCUMENTS

| 4,903,201 | A | 2/1990 | Wagner |
| 5,136,501 | A | 8/1992 | Silverman et al. |
| 5,359,509 | A | 10/1994 | Little et al. |
| 6,408,282 | B1 | 6/2002 | Buist |
| 6,505,175 | B1 | 1/2003 | Silverman et al. |
| 6,766,304 | B2 | 7/2004 | Kemp, II et al. |
| 7,089,193 | B2 | 8/2006 | Newbold |
| 7,130,789 | B2 | 10/2006 | Glodjo et al. |
| 7,308,413 | B1 | 12/2007 | Tota et al. |
| 7,426,489 | B2 | 9/2008 | Van Soestbergen et al. |
| 7,668,767 | B1 | 2/2010 | Borsand |
| 7,742,977 | B1 | 6/2010 | Borsand |
| 2001/0020230 | A1 | 9/2001 | Kaneko et al. |
| 2001/0051909 | A1 | 12/2001 | Keith |

(Continued)

OTHER PUBLICATIONS

Haslett, Tim; Osborne, Charles; Local Rules: Their Application in a Kanban System; International Journal of Operations & Production Management, v20n9 pp. 1078-1092 (2000).*

(Continued)

*Primary Examiner* — Alexander Kalinowski
*Assistant Examiner* — Virpi H Kanervo
(74) *Attorney, Agent, or Firm* — McDonnell Boehnen Hulbert & Berghoff LLP

(57) ABSTRACT

A system and method for dynamic quantity orders in an electronic trading environment are described. According to one method, a dynamic quantity order includes a price, a desired order quantity and a percentage associated with an estimated order quantity that will be filled in an order queue. When the order is received at an electronic exchange, the order is sorted into a pro-rata order queue, and the exchange may estimate a potential order quantity that will be filled in the order queue at the price based on the defined percentage. Subsequently, the exchange may then increase the order quantity of the dynamic quantity order so that if the estimated number of fills occurs, the order quantity of the dynamic quantity order will be filled.

12 Claims, 5 Drawing Sheets

U.S. PATENT DOCUMENTS

| | | |
|---|---|---|
| 2002/0013756 A1 | 1/2002 | Piccioli |
| 2002/0082912 A1 | 6/2002 | Batachia et al. |
| 2002/0091606 A1 | 7/2002 | Shapiro |
| 2002/0091611 A1 | 7/2002 | Minton |
| 2002/0099647 A1 | 7/2002 | Howorka et al. |
| 2002/0133447 A1 | 9/2002 | Mastman |
| 2002/0147622 A1 | 10/2002 | Drolet et al. |
| 2002/0156719 A1 | 10/2002 | Finebaum et al. |
| 2002/0186826 A1 | 12/2002 | Hsu et al. |
| 2002/0194005 A1 | 12/2002 | Lahr |
| 2002/0194115 A1* | 12/2002 | Nordlicht et al. ............ 705/37 |
| 2002/0198816 A1 | 12/2002 | Gilbert et al. |
| 2003/0009387 A1 | 1/2003 | Argust |
| 2003/0014308 A1 | 1/2003 | Takahashi et al. |
| 2003/0023505 A1 | 1/2003 | Eglen et al. |
| 2003/0033239 A1 | 2/2003 | Gilbert et al. |
| 2003/0046220 A1 | 3/2003 | Kamiya |
| 2003/0055778 A1 | 3/2003 | Erlanger |
| 2003/0216932 A1 | 11/2003 | Foley |
| 2004/0093300 A1 | 5/2004 | Burns |
| 2004/0210489 A1 | 10/2004 | Jackson et al. |
| 2004/0267655 A1 | 12/2004 | Davidowitz et al. |
| 2005/0075905 A1 | 4/2005 | Bennett et al. |
| 2006/0173693 A1 | 8/2006 | Arazi et al. |

OTHER PUBLICATIONS

Thondavadi, Nandu N; Raza, Amir; Information Management Key to ISO 9001; Molding Systems, v56n7 pp. 20-25 (Sep. 1998).*

Watts, Charles A; Hahn, Chan K; Sohn, Byung-Kyu; Monitoring the Performance of a Reorder Point System: A Control Chart Approach; International Journal of Operations & Production Management, v14n2 pp. 51-61 (1994).*

McKague, Anne; Hooked on Technology; Canadian Datasystems, v23n10 pp. 24-26 (Oct. 1991).*

Foley, Kevin. Electronic Trading Networks, Stock Exchange Competition. Oct. 17, 2002.

Thondavadi, Nandu N; Raza, Amir; Information Management Kay to ISO 9001; Molding Systems, v56N7 pp. 20-25 (Sep. 1998).

U.S. Appl. No. 12/754,736 filed Apr. 6, 2010, entitled "System and Method for Dynamic Quantity Orders in an Electronic Trading Environment".

* cited by examiner

SYSTEM AND METHOD FOR DYNAMIC QUANTITY ORDERS IN AN ELECTRONIC TRADING ENVIRONMENT

CROSS REFERENCE TO RELATED APPLICATIONS

This application is a continuation of U.S. patent application Ser. No. 12/754,736 filed Apr. 6, 2010, now U.S. Pat. No. 7,844,525, entitled "System and Method for Dynamic Quantity Orders in an Electronic Trading Environment," which is a continuation of U.S. patent application Ser. No. 11/417,516 filed May 3, 2006, now U.S. Pat. No. 7,742,977, entitled "System and Method for Dynamic Quantity Orders in an Electronic Trading Environment," which is a continuation of U.S. patent application Ser. No. 10/676,641 filed Oct. 1, 2003, now U.S. Pat. No. 7,668,767, entitled "System and Method for Dynamic Quantity Orders in an Electronic Trading Environment," the contents each of which are fully incorporated herein by reference.

FIELD OF INVENTION

The present invention is directed towards electronic trading. More specifically, the present invention is directed towards providing means for dynamic quantity orders in an electronic trading environment.

BACKGROUND

In recent years, a trend towards electronic trading has become well-established, causing one major exchange after another to replace or at least supplement the traditional open outcry, where a trade is done face to face, with automated, electronic systems which automatically match bids and offers. While the motivation behind using electronic trading may vary from market to market, greater efficiency and volume are some of the considerations.

Electronic trading is generally based on a host exchange, one or more computer networks and client devices. In general, the host exchange includes one or more centralized computers to form the electronic heart. The exchange allows a trader to participate in trading at least one electronic market, and conducts matching of bids and offers being placed by the subscribing traders for that market. Typically, subscribing traders connect to an exchange by way of a communication link and through an application program interface to establish real-time electronic messaging between the exchange and their terminals. The real-time electronic messaging includes market information that is sent from an electronic market to the traders.

An electronic exchange can list any number of tradeable objects. Often times, traders will trade simultaneously in more than one tradeable object, and they may trade simultaneously tradeable objects that are listed at more than one exchange. Ordinarily, each tradeable object has its own electronic market, and therefore, its own separate stream of market information. Therefore, in these instances, the traders will generally receive more than one stream of market information such that each stream of market information attempts to characterize a given market. In addition to receiving market information from exchanges, a trader might subscribe to news feeds to receive real-time quotations that may assist the trader in making his trading decisions.

Generally, when a trader submits an order to a host exchange, the host checks the conditions associated with the order, for example, price and quantity, and prioritizes the order with other orders of the same price. When the order conditions are satisfied in the market, a trade occurs and trade information is then relayed in some fashion to one or more client devices. In fact, the host exchanges typically publish a data feed to the client devices so that the traders can have access to the most current market information.

Market information commonly includes information regarding the inside market and market depth. The inside market is the lowest sell price in the market and the highest buy price in the market at a particular point in time. Market depth refers to quantities available at the inside market and may also refer to quantities available at other prices away from the inside market. The quantity available at a given price level is usually provided by the host exchange in aggregate sums. In other words, a host exchange usually provides the total buy or the total sell quantity available in the market at a particular price level in its data feed. The extent of the market depth available to a trader usually depends on the host exchange. For instance, some host exchanges provide market depth for all or many price levels, while some provide only quantities associated with the inside market, and others may provide no market depth at all. Additionally, host exchanges can offer other types of market information such as the last traded price ("LTP"), the last traded quantity ("LTQ"), and order fill information.

The costs of electronic trading are in general much lower than those being incurred by traders who trade at the open outcry exchanges. Unlike open outcry systems, electronic trading no longer requires brokers or clerks, and reduces overhead costs including building, staffing, and back-office costs associated with the open outcry exchanges. Regardless of the type of matching algorithm used by the electronic market and charges that are applied by exchanges, traders have limited means to control order positions in an order queue at an electronic exchange even if they are willing to pay higher trading costs. Thus, it is still desirable for electronic trading applications to offer tools that can assist a trader in trading in an electronic trading environment, help making profitable trades in a speedy and accurate manner, while allowing the trader to control his/her order positions at an exchange at least for some orders being submitted by the trader.

BRIEF DESCRIPTION OF THE DRAWINGS

Example embodiments of the present invention are described herein with reference to the following drawings, in which.

DETAILED DESCRIPTION

I. Dynamic Quantity Orders

Figure 1:
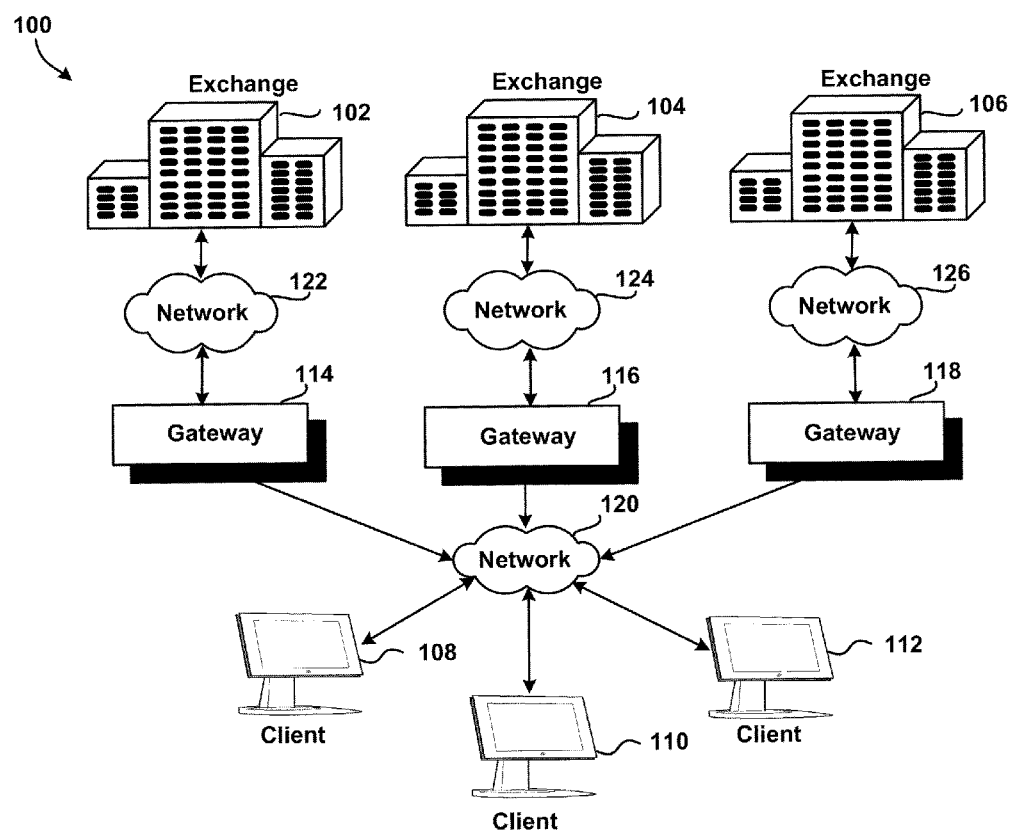
FIG. 1 is an example network configuration for a communication system utilized to access one or more exchanges.

Typically, an electronic exchange maintains an exchange order book that represents unexecuted buy and sell orders for a particular tradeable object. A matching engine at the exchange attempts to match the incoming orders to those orders resting in the exchange order book. If there is no match, the orders are preferably sorted in an order queue by a matching algorithm, such as by a pro-rata algorithm, which assigns to each order a weight parameter that is then used by a matching engine to determine a portion of the order that will be filled when there is an available order quantity at the order's price. In particular, the exchange's logic sorts the orders into the appropriate price queue where the orders rest until they are matched by the matching engine or until the orders are deleted or changed by the trader, for example.

According to a preferred embodiment, a trader may send to an exchange a dynamic quantity order including, among other parameters, an order price, a desired order quantity that a trader wishes to get filled, as well as a percentage associated with an estimated order quantity that will be filled at the price. It should be understood that the desired order quantity to be filled is preferably equal to a full order quantity. However, alternatively, it could be equal to a lower order quantity as well. When the dynamic quantity order is received at the exchange, the exchange may first sort the order into an order queue corresponding to a price level of the order, and then may assign a weight parameter to the order based on the specified order quantity and a total order quantity of all pending orders in the order queue.

Once the weight parameter is assigned to the order, the assigned weight and the desired order quantity may be used to estimate a potential order quantity that will be filled at the price for the dynamic quantity order. According to one embodiment, the exchange may estimate the potential order quantity based on the assigned weight, the desired order quantity as well as the estimated order quantity that will be filled in the order queue. The exchange may then increase the order quantity of the dynamic quantity order so that if the estimated number of fills occurs, the desired order quantity of the dynamic quantity order will be filled. Also, it should be understood that the increases in the order quantity may be performed dynamically based on changes in the total order quantity at the price.

According to one embodiment, once a filled order quantity is detected for a dynamic quantity order having an increased order quantity, the electronic exchange may attempt to delete at least a portion of the remaining increased order quantity. The order quantity that is deleted may depend on a portion of the desired order quantity that got filled. If the filled order quantity is equal to the desired order quantity, the exchange may attempt to delete the full remaining order quantity associated with the increased order quantity. However, if only a portion of the desired order quantity has been filled, the increased order quantity may be dynamically adjusted such that the odds of the remaining portion of the desired order quantity getting filled are once again increased. Also, the adjustment may be based on an estimated order quantity that will be filled in the order queue.

Also, according to the embodiments described in greater detail below, an exchange may charge a trader for increasing the odds of his order getting filled in an order queue according to the method described above, for example. The amount of such fees as well as application of the fees to the trader's account may depend on different factors that will be described in greater detail below.

While the present invention is described herein with reference to illustrative embodiments for particular applications, it should be understood that the present invention is not limited thereto. Those having ordinary skill of art will recognize that many additional modifications and embodiments are possible as well.

II. Hardware and Software Overview

FIG. 1 is a block diagram illustrating an example trading system 100 in accordance with the preferred embodiments. The system 100 includes one or more exchanges 102, 104, 106 and one or more client devices 108, 110, 112. Intermediate devices such as gateways 114, 116, 118, routers (not shown), and other such types of network devices may be used to connect network 120 to networks 122, 124, and 126 such that client devices 108, 110, 112 and exchanges 102, 104, 106 can communicate market information. It should be understood that the present invention is not limited to any particular system configuration. For example, networks 122, 124, and 126 could represent the same network, network 120 could represent the same network as networks 122, 124, and 126, or client devices 108, 110, 112 could connect separately to gateways 114, 116, 118. Of course, the preferred embodiments may be implemented on many other system configurations.

A. Exchange

Any of exchanges 102, 104, 106 may represent, for example, the London International Financial Futures and Options Exchange ("LIFFE"), the Chicago Board of Trade ("CBOT"), the New York Stock Exchange ("NYSE"), the Chicago Mercantile Exchange ("CME"), the Exchange Electronic Trading ("Xetra," a German stock exchange), or the European Exchange ("Eurex"), or any other exchange that participates in electronic trading. Exchanges 102, 104, 106 might also refer to other facilities, which include basic or more complex systems that automatically match incoming orders. These example exchanges and other exchanges are well known in the art. Communication protocols required for connectivity to one of these exchanges are also well known in the art.

Exchanges 102, 104, 106 allow traders to log into a market to trade tradeable objects. As used herein, the "tradeable object" refers simply to anything that can be traded with a quantity and/or price. It includes, but is not limited to, all types of tradeable objects such as financial products, which can include, for example, stocks, options, bonds, futures, currency, and warrants, as well as funds, derivatives, and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable object, such as a class of tradeable objects.

An exchange 102, 104, 106 can implement numerous types of order execution algorithms, and sometimes the type of algorithm depends on the tradeable object being traded. One example order execution algorithm is a pro rata algorithm. However, it should be understood that one skilled in the art can adapt the example embodiments to work with other existing or later developed order execution algorithms. The pro rata algorithm, used for some tradeable objects listed with LIFFE, for example, splits orders for the same price into an order queue corresponding to the order's price. Once the orders corresponding to the same price are in the order queue, the pro rata algorithm assigns a weight to each order in the order queue, and each weight may be used by the matching engine to determine what portion of the available order quantity will be used to fill each order. Once at least a portion of each order in the order queue is filled during the first round of fills during which the available order quantity is distributed between the orders, the pro-rata algorithm may reassign weights for each pending order in the order queue. It should also be understood that the order queue is a term that covers any type of data structure and/or memory storage system used by a exchange to conduct orderly financial transactions in a broad range of systems such as, for example, FIFO or pro rata systems.

Regardless of the type of order execution algorithm used, each exchange 102, 104, and 106 preferably provides similar types of information in market updates found in their data feeds to subscribing client devices 108, 110, and 112. Market information may include data that represents just the inside market. The inside market is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually provided by the host exchange in aggregate sums. The extent of the market depth available to a trader usually depends on the exchange. For instance, some electronic exchanges provide market depth for all (or most) price levels, some exchanges provide market depth for a finite number of price levels, while some exchanges provide only quantities associated with the inside market, and others may provide no market depth at all. Additionally, exchanges 102, 104, 106 can offer other types of market information, for example, the last traded price ("LTP"), the last traded quantity ("LTQ"), total traded quantity ("TTQ"), and order fill information. It should be understood that the present invention is not limited to receiving and analyzing a data feed consisting of market updates. One skilled in the art would recognize upon reading the description herein that the present invention has utility in any trading application where any particular type of data feed is provided.

B. Gateway

Gateways 114, 116, and 118 are devices such as a personal computer, mainframe, super minicomputer, workstation, or microcomputer that connect network 120 to networks 122, 124, 126 so that market information can be successfully passed between client devices 108, 110, 112 and exchanges 102, 104, 106. Gateways 114, 116, 118 receive market information from exchanges 102, 104, 106 and convert it to a form compatible with the protocols used by client devices 108, 110, 112 using conversion techniques known in the art. Also, as known by those skilled in the art, gateways 114, 116, and 118 may have one or more servers to support the data feeds, such as a price server for processing price information, an order server for processing order information, and a fill server for processing fill information. A trader at one of client devices 108, 110, and 112 can subscribe to price information, order information, and fill information for a particular market hosted at exchanges 102, 104, 106. Gateways 114, 116, 118 also receive transaction information, such as orders, order changes, queries, etc., from client devices 108, 110, 112 and forward that information to corresponding exchanges 102, 104, and 106.

C. Client Device

Client devices 108, 110, 112 are devices that provide an interface for traders to trade one or more tradeable objects listed with one, some, or all of exchanges 102, 104, 106. Some exchanges of client devices include a personal computer, laptop computer, hand-held computer, and so forth. Client devices 108, 110, 112, according to the preferred embodiments, include at least a processor and memory. The processor and memory, which are both well-known computer components, are not shown in the Figure for sake of clarity. Preferably, the processor has enough processing power to handle and process various types of market information. Of course, the more market information is received and processed, the more processing power is preferred. However, any present day processor has enough capability to perform at least the most basic part of the present invention.

Memory may include a computer readable medium. The term computer readable medium, as used herein, refers to any medium that participates in providing instructions to a processor unit for execution. Such a medium may take many forms, including but not limited to, non-volatile media, and transmission media. Non-volatile media include, for example, optical or magnetic disks, such as storage devices. Volatile media include dynamic memory, such as main memory or random access memory ("RAM"). Common forms of computer-readable media include, for example, floppy disks, flexible disks, hard disks, magnetic tape, punch cards, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

Client devices 108, 110, 112 receive market information from any of exchanges 102, 104, 106. According to the preferred embodiment, market information is displayed to the trader(s) on the visual output device or display device of client devices 108, 110, 112. The output device can be any type of display. For example, the display could be a CRT-based video display, an LCD-based or a gas plasma-based flat-panel display, a display that shows three-dimensional images, or some other type of display. The present invention is not limited to any particular type of display.

Upon viewing the market information or a portion thereof, a trader may wish to send orders to an exchange, cancel orders in a market, change orders in a market, query an exchange, and so on. To do so, the trader may input various commands or signals into the client device 104, for example, by typing into a keyboard, inputting commands through a mouse, or inputting commands or signals through some other input device. Upon receiving one or more commands or signals, client devices 108, 110, 112 preferably generate transaction information. For instance, a trader may click a mouse button to initiate an order to buy a tradeable object. Then, transaction information would include an order to buy a particular quantity of the tradeable object at a particular price. There are many different types of messages and/or order types that can be submitted, all of which may be considered various types of transaction information. Once generated, transaction information is sent from client device 104 to host exchange 102 over network(s) 120, 122, 124, 126.

Figure 2:
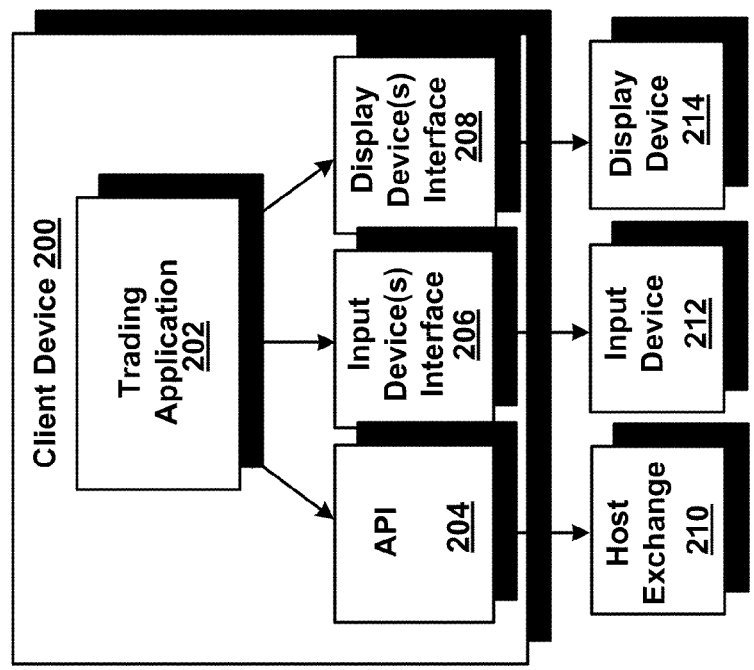
FIG. 2 is a block diagram illustrating an example client device that can be used in the example network of FIG. 1.

FIG. 2 is a block diagram illustrating an example client device 200 which may be similar to the type of client devices 108, 110, and 112 shown in FIG. 1. The client device 200 can be any particular type of computing device, examples of which were enumerated above with respect to the client device. According to the preferred embodiments, the client device 200 has a trading application 202 stored in memory that when executed arranges and displays market information in many particular ways, usually depending on how the trader prefers to view the information. The trading application 202 may also implement the preferred embodiments described herein. Alternatively, the preferred embodiments described herein may occur elsewhere such as outside of the trading application 202 on the client device 200, on a gateway, or on some other computing device. Preferably, the trading application 202 has access to market information through an API 204 (or application programming interface), or the trading application 202 could also forward transaction information to the exchange 210 via the API 204. Alternatively, the API 204 could be distributed so that a portion of the API rests on the client device 202 and a gateway, or at the exchange 210. Additionally, the trading application 202 may receive signals from an input device 212 via an input device interface 206, and can be given the ability to send signals to a display device 214 via a display device interface 208.

III. Dynamic Quantity Orders in a Pro-Rata System

When an incoming order arrives at an electronic exchange, a matching engine attempts to match some or all of the incoming order, depending on the order's size and what is available in the market, to the quantity resting in the exchange's order book. If the quantities are not matched immediately, the arriving orders are sorted by price into an order queue where the orders rest until they are matched by the matching engine, or until the orders are deleted or changed by the trader, for example.

In a pro-rata system, the order is not assigned any priority level, but rather a matching engine distributes fills based on a weighted average algorithm that matches orders in a price order queue in proportion to their size. In other words, each order may be assigned a weight parameter that is determined using an order quantity associated with each order and a sum of all order quantities in the order queue. The matching engine may then use the weight parameter to determine a portion of the order that will be filled. For example, a weight parameter assigned to an order may define a percentage of an order quantity, or a specific portion of an order to be filled. In such a system, a higher weight will be assigned to an order, and thus, a higher portion of the order will be filled, having a higher order quantity compared to orders that have lower order quantities in an order queue. Thus, although no priority levels are actually assigned to orders in a pro-rata system, the orders are in a way "prioritized" since the orders get filled in proportion to their order quantities.

Also, even though time is not a direct factor in a pro-rata system and does not directly control which order in an order queue is filled first, the time when an order is placed in an order queue is still an important factor. More specifically, an order in a pro-rata system will be assigned a weight parameter that determines what portion of the order will get filled only when the order is actually received at an electronic exchange and placed in an order queue.

As mentioned in earlier paragraphs, when an order is received at an electronic exchange and placed in an order queue, a pro-rata algorithm assigns to the order a weight parameter that determines what portion of the order will get filled during a first series of fills using an available order quantity at a price level. For example, if there is a single order to buy in an order queue, a pro-rata algorithm may assign to an order a weight parameter of 1, according to which any available order quantity on a sell side of the market will be fully used to fill that order. Alternatively, for example, if there are two buy orders in an order queue, a first buy order having an order quantity of 50, and a second buy order also having an order quantity of 50, a pro-rata algorithm may assign to the two orders weights of 0.5 that are determined based on an order quantity of each order divided by the total order quantity of the two orders. Then, if an order to sell comes in having an order quantity of 70, based on the assigned weights of 0.5, the available order quantity for sale will be equally divided between the two buy orders such that the order quantities of 35 will be filled for the first and second orders.

According to an example embodiment, a trader may control and increase an order quantity that will be potentially filled at an electronic exchange by sending a dynamic quantity order to the exchange. For example, an exchange may provide a dynamic quantity order type to traders who trade at the exchange. Alternatively, any order that is sent to an exchange by a trader may include a dynamic quantity parameter, and the trader may use the parameter to define a desired order quantity for which the possibility of the order quantity getting filled should be increased under certain market conditions, for example.

A dynamic quantity order may include a number of parameters including an order price, and a desired order quantity to be filled regardless of an exchange-assigned weight and regardless a total order quantity pending in the order queue. According to one embodiment, when a dynamic quantity order is received at the exchange and placed in a pro-rata order queue, the exchange may assign a weight parameter to the dynamic quantity order that may be calculated based on the desired order quantity and a total order quantity pending in the order queue. The exchange may then determine a potential order quantity that will be filled at the price based on the assigned weight parameter. In addition to using the assigned weight and the order quantity, the exchange may estimate a potential order quantity that might be filled using an estimated order quantity that will filled in the order queue at the price level.

An estimated order quantity that will be filled in an order queue at a price may be set using different methods. In one embodiment, each exchange may use its own default estimate that may vary based on the total pending order quantity in the order queue, for example. Alternatively, when a trader sends a dynamic quantity order to an exchange, the trader may define a percentage associated with an estimated order quantity that will be filled. In an embodiment where a trader defines a percentage, the trader effectively defines a risk that he/she is willing to take by having his order quantity increased such that a possibility of the desired order quantity is increased. It should be understood that the percentage may be static or dynamic. If the percentage is dynamic, its value may vary based on any conditions or rules defined by a trader or an exchange, such as a total order quantity pending in the order queue, for example.

For example, let's assume that there is a first order having an order quantity of 300 pending in an order queue, and a dynamic quantity order for 100 is received at an electronic exchange and placed in a pro-rata order queue. Let's also assume that a percentage associated with an estimated order quantity that will be filled in the order queue is set to 50%. In such an embodiment, a pro-rata algorithm will assign a weight of 0.75 to the first order, and a weight of 0.25 to the dynamic quantity order. Based on the defined percentage, it is assumed that an order quantity of 200 will be filled in the order queue (50% of the total order quantity 400). The exchange may then estimate a potential order quantity that will be filled at the price based on the specified percentage and the calculated weight. According to the example provided above, a potential order quantity for the dynamic quantity order will be 50 (one fourth of 200), which is lower than the desired order quantity of 100 to be filled for the dynamic quantity order. The exchange may then increase should the order quantity of the dynamic quantity order such that if the estimated number of fills occurs, the desired order quantity will be filled. In the example provided above, the order quantity of 100 may be increased to 300. When the order quantity for the dynamic quantity order is increased to 300, the total order quantity in the queue is 600, and the weight assigned to each order is 0.5. Then, using the estimated order quantity of 200 that would be available for filling orders in the order queue based on the defined 50%, the order quantity that will be possibly filled for the second order will be 100 since the quantity of 200 will be equally divided between the two orders in the order queue.

It should be understood that defining a percentage associated with an estimated order quantity that will be filled in an order queue is only one of many different methods that a trader can use to control the order quantity increases. When a percentage is used as a limit on the quantity increases, the higher percentage defined by a trader will result in lower quantity increases. In addition to defining a percentage associated with an estimated quantity limit, a dynamic quantity order may also include a plurality of conditional rules defining when and to what level a trader would like to have his order quantity temporarily increased. Also, when an order quantity of a dynamic quantity order is increased, a trader may be taking a risk of having a higher order quantity filled than he originally intended. Therefore, to minimize the risk, a trader could specify a maximum order quantity to which the trader is willing to have his order quantity increased such that, in the worst case scenario, the order quantity that will be filled will not be higher than the defined maximum order quantity. Alternatively, an exchange could set such maximum value. Also, a trader may wish to have the order quantity increased only if, based on an assigned weight, an order quantity to be potentially filled falls below a certain trader-defined level. It should be understood that different rules and different limitations formats are possible as well.

In one embodiment, a trader who submits a dynamic quantity order to an electronic exchange may pay higher per-trade fees, and at least a portion of such a fee may be payable to an exchange performing the process of temporarily increasing an order quantity in an order queue. Additionally, a portion of such a fee could be also applied to accounts of traders associated with other pending orders in the order queue. However, in an alternative embodiment, an exchange may apply no charges for using dynamic quantity orders. One of the reasons for not applying any fees is that the volume being traded at the exchange may be increased since filled order quantities of some dynamic quantity order may be higher than desired order quantities.

In an embodiment in which an exchange actually charges traders for using dynamic quantity orders, the fees applied by the exchange may depend on quantity increases that are required to increase a possibility of the desired order quantity getting filled. In such an embodiment, a trader using a dynamic quantity order could define a maximum fee that the trader is willing to pay for having his order quantity increased. When the exchange receives such an order, the exchange may use the maximum fee that a trader is willing to pay to determine a maximum order quantity by which a trader's order quantity can be increased. Then, if the order quantity by which an exchange would have to increase the trader's order quantity is higher than the maximum order quantity, the exchange may limit the increase to the maximum order quantity determined based on the maximum fee. It should be understood that other limitation factors could also be used in addition to the factors defined above.

Figure 3:
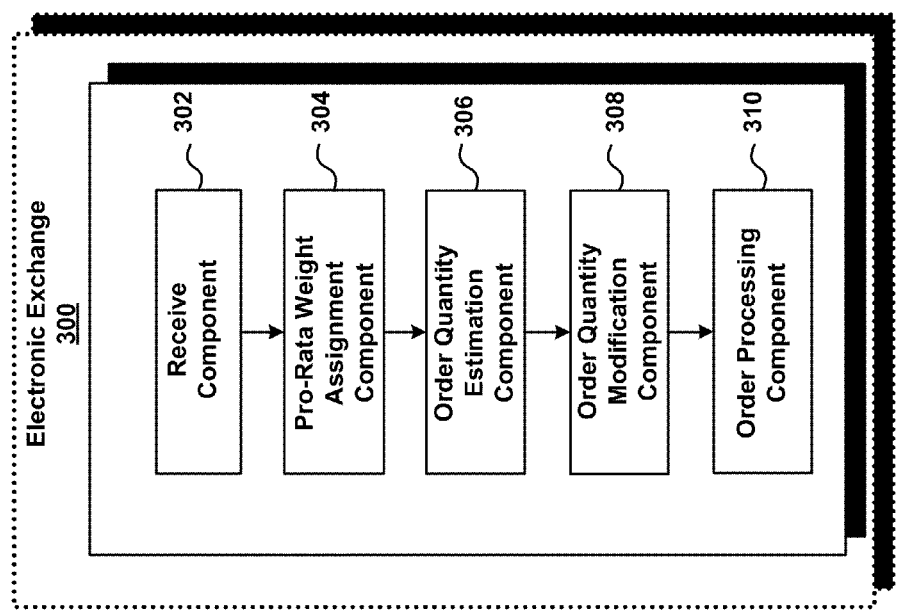
FIG. 3 is a block diagram illustrating an example electronic exchange that can be used in the example network of FIG. 1.

FIG. 3 is a block diagram illustrating an electronic exchange 300 that provides functionality to trade at least one tradeable object using various components 302, 304, 306, 308, and 310 for carrying the present embodiments. The tradeable object is listed at the electronic exchange 300. The exchange 300 includes a receive component 302, a pro-rata weight assignment component 304, an order quantity estimation component 306, an order quantity modification component 308, and an order processing component 310. The receive component 302, the pro-rata weight assignment component 304, the order quantity estimation component 306, the order quantity modification component 308, and the order processing component 310 may include software and hardware elements to perform their functions. It should be understood, however, that the electronic exchange 300 may include more or fewer components that are not shown in FIG. 3. Also, each of the illustrated components may be combined with other components. For instance, some or all of the components 302, 304, 306, 308, and 310, may be combined with a matching engine component (not shown) of a particular market.

The receive component 302 receives an incoming order for one or more tradeable objects being traded at the electronic exchange 300. According to one preferred embodiment, the order is a dynamic quantity order and is received in an order request message including a price and a desired order quantity. In one embodiment, if an exchange allows traders to define a risk that a trader is willing to take by defining a percentage for an estimated order quantity that will be filled in an order queue, the dynamic quantity order could also define such percentage. However, it should be understood that the received order could also include other parameters defined above. Preferably, a trader defines and sends the dynamic quantity order electronically to the electronic exchange 300.

When the exchange 300 receives the order request message including a dynamic quantity order request, the order queue-sorting component 304 may sort the order based on its price level into a predetermined order queue associated with the order price. In a pro-rata system, the queue sorting component 304 places the received order into an order queue associated with a price specified for the order. When the order is placed in the order queue, the queue sorting component 304 may also assign a weight parameter to the dynamic quantity order based on the desired order quantity and a total order quantity of other orders pending in the order queue. It should be understood that rather than assigning weights to the orders as the orders are placed in the order queue, the weights could also be assigned at some other times, such as when there is some order quantity that can be used to match the orders pending in the order queue.

When an order is placed in an order queue, the order quantity estimation component 306 may estimate a potential order quantity that will be filled at the price based on the assigned weight parameter and the desired order quantity. Also, as described in greater detail below, the potential order quantity that will be filled at the price may be also calculated based on a percentage associated with an estimated order quantity that is assumed to be filled in the order queue. However, if such percentage is not defined in a dynamic quantity order, an exchange could set its own default value. Also, rather than estimating the order quantity that will be potentially filled for the dynamic quantity order, the exchange may automatically increase the order quantity of the dynamic quantity order.

The order quantity modification component 308 may increase the order quantity of they dynamic quantity order so that if the estimated number of fills occurs, the desired order quantity will be filled. As mentioned earlier, the order quantity modification component 308 may be limited as to how much it will increase the order quantity, and the limitations may be based on exchange-set rules or trader-defined limitations. When the order quantity associated with the dynamic quantity order is increased, the order quantity modification component 308 may assign a second weight parameter to the order that is determined based on the increased order quantity and a new total order quantity in the order queue at the price.

Once the order quantity of the dynamic quantity order is increased to a level that will increase a possibility of the desired order quantity specified in the order getting filled, the order processing component 310 may monitor fills related to that order. When the order processing component 310 detects a filled order quantity for the dynamic quantity order, it may first determine if the filled order quantity is not lower than the desired order quantity of the dynamic quantity order. If the filled order quantity is not lower that the desired order quantity, the order processing component 310 may attempt to delete a remaining order quantity of the increased order quantity. However, if the filled order quantity is lower than the desired order quantity, the order quantity modification component 308 may dynamically adjust the increased order quantity such that the possibility of a remaining portion of the desired order quantity getting filled is increased. It should be understood that the increased order quantity is dynamically adjusted based on a new current order quantity in the order queue at the price.

Figure 4:
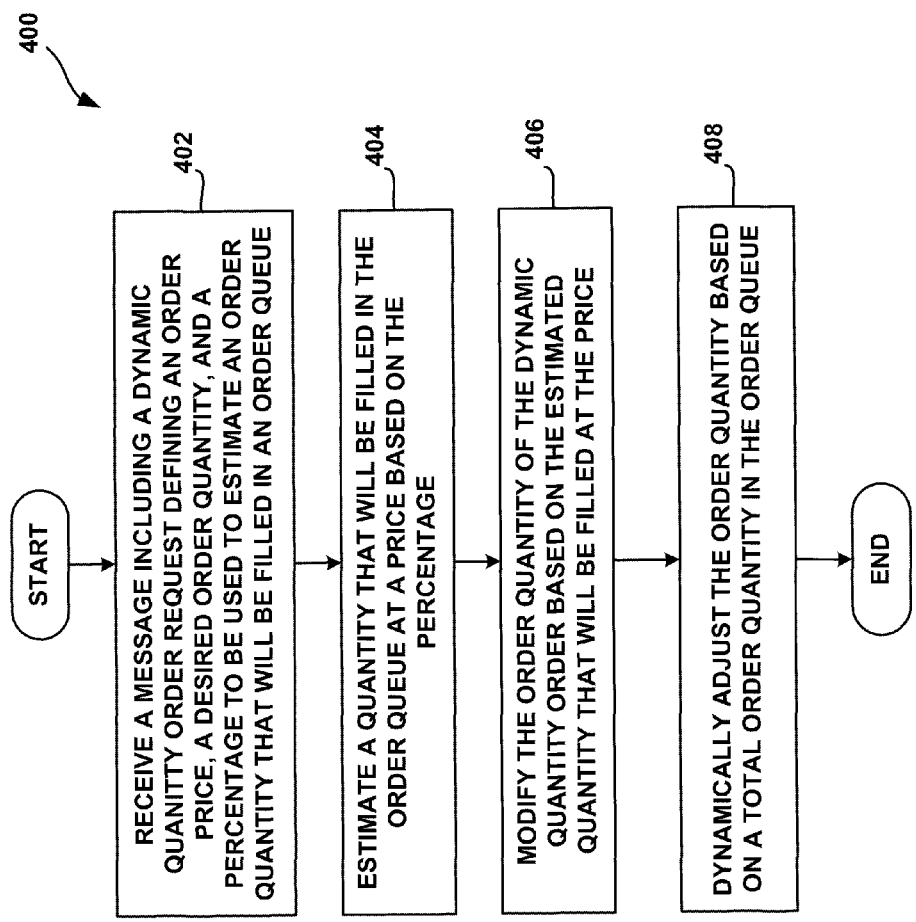
FIG. 4 is a flow chart illustrating one example method for increasing an order quantity of a dynamic quantity order in a pro-rata system in an electronic trading environment.

FIG. 4 is a flow chart illustrating one example method 400 for increasing order quantities for dynamic quantity orders to increase a possibility of desired order quantities getting filled in an electronic trading environment. It should be understood that the flow chart in FIG. 4, as well as any other flow charts described hereinafter, provide only an illustrative description of one method for increasing and processing priority levels of orders in a pro-rata system, and the steps may occur in one or more orders that are different than the one illustrated in FIG. 4. Also, the steps of the method 400 may be performed by the components described in relation to FIG. 3. However, it should be understood that any other network components located at one or more network entities could also be used to perform the method of FIG. 4.

At step 402, an electronic exchange receives a message including a dynamic quantity order request defining an order price, a desired order quantity, and a percentage to be used to estimate an order quantity that will be filled in an order queue. In addition to these parameters, the order could also define other limitation as to when and how much a trader is willing to have his order quantity increased. For example, a trader may wish to have his order priority kept at the standard priority level for a specific time, such as 30 seconds, and then if the order will not get filled during that time, the trader may wish to have his order priority increased. Alternatively, the trader may wish to have his order's priority level increased based on dynamic changes of pending order quantity in the order queue. For example, the trader may wish to have his order quantity increased only if a total order quantity pending in the order queue reaches a predetermined threshold level. It should be understood that the dynamic quantity order could also define different limitations and controlling parameters, some of which have been described in greater detail above. Once the order is received at the exchange, the dynamic quantity order is placed in an order queue, such as a pro-rata order queue.

At step 404, an exchange may estimate an order quantity that will be filled in the order queue at the price corresponding to the dynamic quantity order based on the percentage specified by the trader or any default value used by the exchange. For example, if the defined percentage is set to 25%, and a total pending order quantity in the order queue is 1,000, it will be estimated that the order quantity of 250 will be filled in the order queue.

At step 406, the exchange may modify the order quantity of the dynamic quantity order based on the estimated quantity that will be filled at the price so that if the estimated number of fills occurs at the price, the desired order quantity of the dynamic quantity order will be filled. Referring to the example provided above, if there is an order quantity of 300 associated with a first order pending in an order queue when a dynamic order quantity having a desired order quantity of 100, and a percentage of 50 is received at an exchange, the order quantity of the dynamic quantity order will be increased to 300 to increase a possibility of the desired order quantity of 100 getting filled if 200 fills occurs at the price of the dynamic quantity order.

At step 408, the exchange may dynamically adjust the increased order quantity based on changes in a total order quantity in the order queue. It should be understood that the step of adjusting the increased order quantity may be performed every time a change is detected in the total order quantity pending in the order queue.

Figure 5:
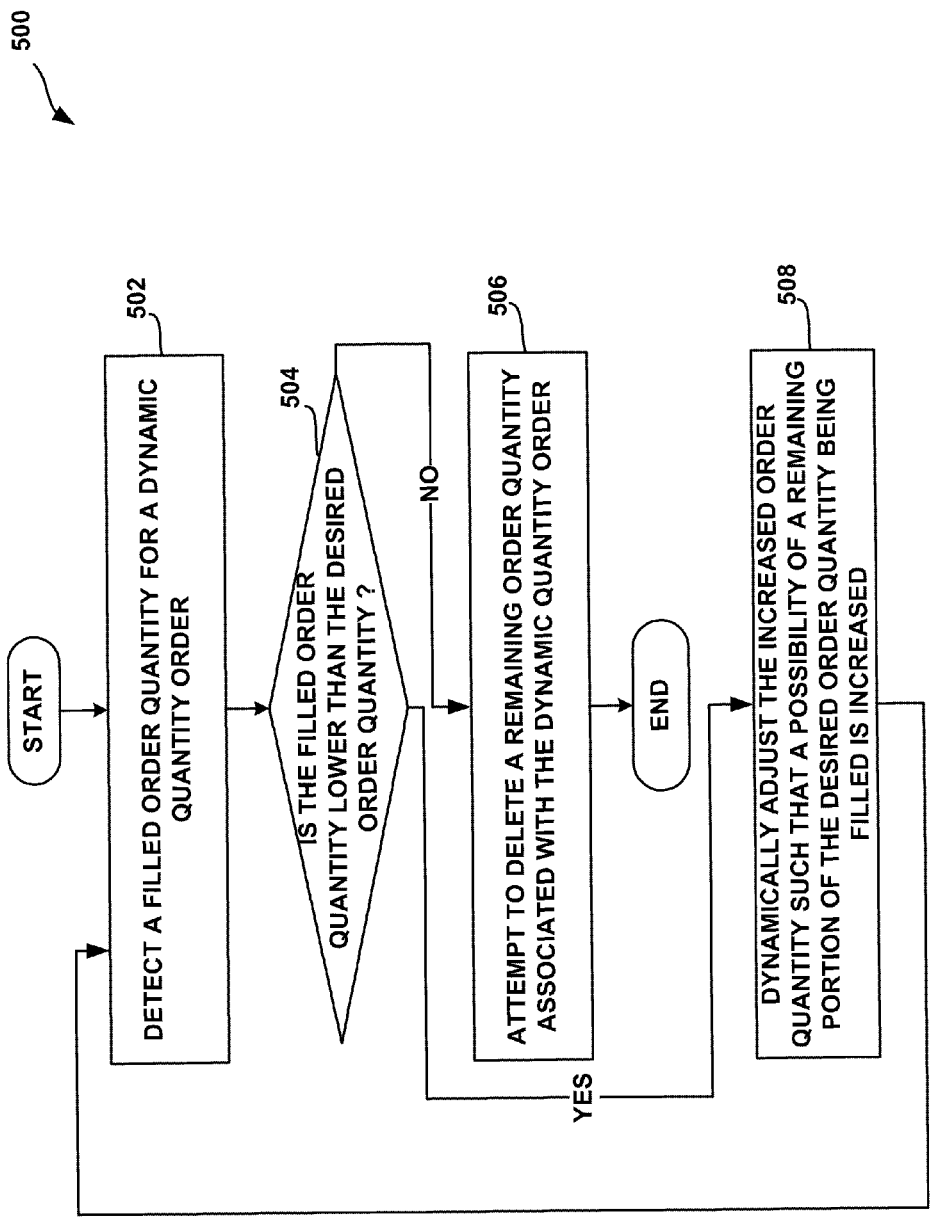
FIG. 5 is a flow chart illustrating one example method for processing a dynamic quantity order in a pro-rata system.

FIG. 5 is a flow chart illustrating a method 500 for processing a dynamic quantity order having a modified order quantity in a pro-rata system. It is assumed that the order quantity of the order has been increased such that a possibility of a desired order quantity getting filled is increased.

At step 502, the order processing component 310 at an electronic exchange detects a filled order quantity for a dynamic quantity order having an increased order quantity. Once the filled order quantity is detected, at step 504, the processing component 310 may determine if the filled order quantity is lower than the desired order quantity. If the filled order quantity is not lower than the desired order quantity, at step 504, the order processing component 310 may attempt to delete a remaining order quantity associated with the dynamic quantity order. Referring back to the example in which a desired order quantity of 100 associated with a dynamic quantity order was increased to 300, let's assume that the full desired order quantity was filled for the dynamic quantity order. In such an embodiment, the order processing component 310 may attempt to delete the remaining order of quantity of 200 associated with the dynamic quantity order.

However, if the filled order quantity is lower than the desired order quantity, at step 508, the order quantity modification component 308 may dynamically adjust the increased order quantity such that a possibility of a remaining portion of the desired order quantity being filled is increased. Let's refer to the example given above, where the order queue includes two pending orders, one standard order having an order quantity of 300, and another dynamic quantity order having an increased order quantity of 300 and the desired order quantity of 100. In this example, the desired order quantity was increased based on the assumption that the estimated order quantity of 200 will be filled in the order queue. Now, let's assume that a total filled quantity in the order queue was 100 rather than 200, thus, effectively leaving the order quantity of 250 for the first order and the order quantity of 250 for the dynamic quantity order unfilled. Using the original 50%, it will be assumed that an estimated order quantity that will be filled in the queue is now set to 150 (50% of 300, unfilled quantity of 250 of the original order plus unfilled remaining order quantity of 50 of the dynamic quantity order). In this example, the order quantity of the dynamic quantity order is now decreased to 125 from 250, such that the weight assigned to the dynamic quantity order is now ⅓, which based on the estimated order quantity of 150 will increase a possibility of the remaining desired order quantity of 50 getting fully filled. Once the order quantity modification component 308 dynamically adjusts the remaining order quantity corresponding to the dynamic quantity order, the method continues at step 502.

It should be understood that different methods could also be used to adjust order quantities of dynamic quantity orders once a fill for the dynamic quantity orders are detected. For example, rather than using the remaining order quantity to be filled for the dynamic quantity order (such as 50 in the above example), the calculations may be based on the increased values (such as 250 for the dynamic quantity order). Other methods could also be used.

The above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and methods for changing order priority levels in a pro-rata system in an electronic trading environment may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A system for dynamic quantity orders in an electronic trading environment, the system including:
a computing device of an electronic exchange configured to receive a dynamic quantity order, wherein the dynamic quantity order comprises a price and a desired order quantity, wherein the dynamic quantity order is associated with an order quantity by the computing device of the electronic exchange, wherein the order quantity is initially the desired order quantity, wherein the dynamic quantity order is placed into an order queue based on the price;
wherein the computing device of the electronic exchange is configured to estimate a potential order quantity at the price, wherein the potential order quantity represents an estimate of an amount of quantity that will be filled at the price;
wherein the computing device of the electronic exchange is configured to increase the order quantity to an increased order quantity based on the potential order quantity; and
wherein the computing device of the electronic exchange is configured to dynamically adjust the order quantity based on a total order quantity in the order queue at the price.

2. The system of claim 1, wherein the order queue is processed by the electronic exchange such that orders are filled based on a pro-rata priority.

3. The system of claim 2, wherein the computing device of the electronic exchange is configured to, when the dynamic quantity order is received at the electronic exchange, assign a first weight parameter to the dynamic quantity order based on the desired order quantity and the total order quantity in the order queue, wherein the order quantity is increased to the increased order quantity further based on the first weight parameter.

4. The system of claim 1, wherein the dynamic quantity order further comprises a percentage.

5. The system of claim 4, wherein the computing device of the electronic exchange is configured to estimate the potential order quantity further based on the percentage.

6. The system of claim 1, wherein the computing device of the electronic exchange is configured to estimate the potential order quantity based on a default set by the electronic exchange.

7. The system of claim 3, wherein the computing device of the electronic exchange is configured to, when the order quantity associated with the dynamic quantity order is increased, assign a second weight parameter to the dynamic quantity order, wherein the second weight parameter is determined based on the increased order quantity and a new total order quantity in the order queue at the price.

8. The system of claim 1, wherein the computing device of the electronic exchange is configured to detect a filled order quantity associated with the dynamic quantity order, wherein the computing device of the electronic exchange is configured to determine that the filled order quantity is not lower than the desired order quantity of the dynamic quantity order, and wherein the computing device of the electronic exchange is configured to attempt to delete a remaining order quantity associated with the increased order quantity.

9. The system of claim 1, wherein the computing device of the electronic exchange is configured to detect a filled order quantity associated with the dynamic quantity order, wherein the computing device of the electronic exchange is configured to determine that the filled order quantity is lower than the desired order quantity of the dynamic quantity order, and wherein the computing device of the electronic exchange is configured to dynamically adjust the increased order quantity based on a new total order quantity in the order queue at the price.

10. The system of claim 1, wherein the computing device of the electronic exchange is configured to apply a fee for increasing the order quantity paid by a trader associated with the dynamic quantity order.

11. The system of claim 10, wherein at least a portion of the fee is paid to the electronic exchange.

12. The system of claim 10, wherein the fee is paid when at least a portion of the order quantity is filled.

* * * * *